Patented June 22, 1937

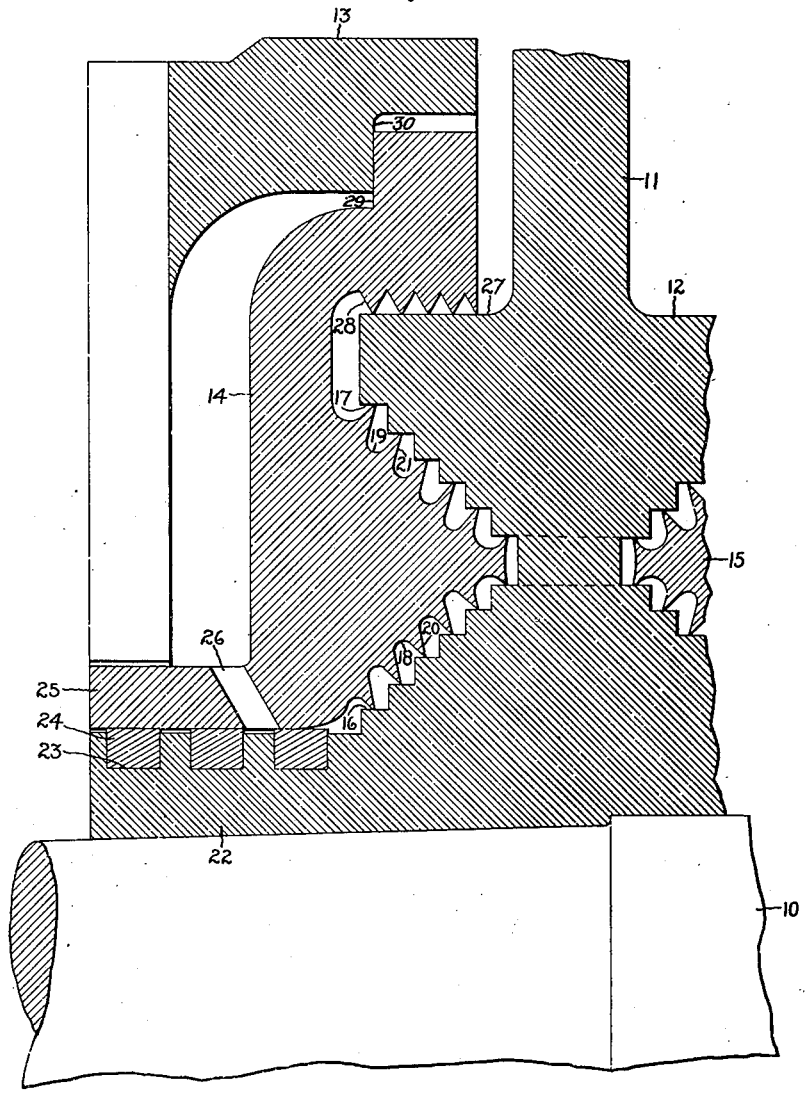

2,084,909

UNITED STATES PATENT OFFICE 2,084,909

PACKING ARRANGEMENT

Bruno Hoffmann, Berlin, Germany, assignor to General Electric Company, a corporation of New York Application May 17, 1935, Serial No. 22,102
In Germany June 8, 1934

2 Claims. (Cl. 286—10)

The present invention relates to packing arrangements for sealing a rotatable machine element, such as a shaft, against a stationary machine element, such as a casing. More specifically, the invention relates to the kind of labyrinth packing arrangements which include one element with a plurality of packing surfaces in stepped formation and a second element with similar packing surfaces in proximity to the surfaces of the first element. Such packing arrangements may be used in connection with elastic fluid turbines although they are not necessarily limited thereto. In certain cases, where fluid under high pressure is to be sealed against atmosphere, it becomes necessary to provide a great many packing surfaces to insure satisfactory sealing.

The object of my invention is to provide an improved construction and arrangement for packings between a rotatable and a stationary machine element whereby a great many packing surfaces may be provided over a comparatively short axial length. The obvious advantage of such packings is that they increase but little the axial length of a machine and that they can be manufactured at relatively low cost.

For a consideration of what I believe to be novel and my invention, attention is directed to the following description and the claims appended thereto in connection with the accompanying drawing which forms a part of my specification.

The single figure of the drawing illustrates a sectional view, partly broken away, of a packing arrangement in connection with a small, single-wheel elastic fluid turbine.

The turbine comprises a rotatable element including a shaft 10 supporting a bucket wheel 11 having a hub 12 and a stationary element including a casing 13. Leakage along the shaft and the wheel past the casing 13 is reduced by packing means including rotatable and stationary elements. In accordance with my invention the hub of the wheel is formed to define a rotatable element of the packing. The latter also includes stationary elements 14 and 15 respectively on opposite sides of the wheel. The hub 12 and the stationary packing element 14 are provided with packing surfaces arranged in stepped formation with corresponding surfaces in proximity to each other. More specifically, the left-hand side of the hub has stepped packing surfaces 16 formed on a conical recessed surface of the hub, which surface is inclined towards the left-hand end of the shaft 10. The hub 12 has other stepped packing surfaces 17 also formed on a conical surface of the hub, which conical surface, however, is inclined towards the right-hand end of the shaft. Broadly, the face of the hub forms two oppositely directed, grooved, conical packing surfaces. The stationary element 14 is similarly provided with two oppositely directed, grooved, conical packing surfaces 18 and 19, respectively. In this particular case the packing surfaces 18 and 19 of the stationary element form teeth 20 and 21 respectively disposed in proximity to the stepped surfaces 16 and 17 respectively. From another viewpoint, the surfaces 18 and 19 of the stationary member form an annular wedge-shaped member projecting into an annular, conically-shaped, grooved recess of the stationary packing member, in the present instance the hub 12. Leakage of fluid is further reduced by the provision of an extension 22 integrally united with the hub and secured to the shaft. The extension 22 has an outer, cylindrical surface with grooves 23 for accommodating packing rings 24. The latter bear against the inner surface of a cylindrical extension 25 of the stationary packing element 14. The cylindrical extension 25 has a channel or port 26 establishing communication between the adjacent packing or sealing surfaces and the atmosphere. An outer portion of the hub has a cylindrical surface 27. Leakage along this surface is reduced by the provision of packing teeth 28 formed on a corresponding cylindrical surface of the stationary element 14. The outer portion of the stationary element 14 forms a shoulder 29 bearing against the corresponding shoulder 30 formed on the casing 13.

The packing arrangement on the right-hand side of the hub is similar to the one described above with respect to the left-hand side of the hub.

During operation, the flow of fluid along the side wall of the bucket wheel is reduced first by the cylindrical packing elements 27, 28, then by the stepped packing surfaces 17, 21, then by the other stepped packing surfaces 16, 20 and finally by the packing elements 24, 25. Leakage, as far as it takes place, is discharged through the channel 26 in the cylindrical extension 25 to the atmosphere or another suitable point.

During operation, the pressure existing between the adjacent disk surfaces of the stationary packing element 14 and the wheel 11 forces the stationary element 14 towards the left, that is, into contact with the casing at the shoulders 29, 30.

With my invention I have accomplished an improved construction and arrangement of packings between stationary and rotatable elements whereby the over-all length of the packings may be considerably reduced. One of the packing elements, according to my invention, is annular and wedge-shaped with opposite sides of the wedge provided with packing grooves or teeth. This wedge-shaped element enters an annular recess having similar grooves or teeth of the other element. The packing is relatively light in weight, especially if one of its elements is formed directly on a portion of a wheel or like machine element to be sealed against another element.

What I claim as new and desire to secure by Letters Patent of the United States is:

1. The combination of a shaft, a rotatable element having a hub with an annular conically-shaped recess and being secured to the shaft, a casing enclosing the rotatable element and a packing for reducing leakage between the shaft and the casing comprising a stationary packing element having a wedge-shaped annular portion disposed in the recess of the hub and with packing surfaces in proximity to the surface of the recess, an extension secured to the shaft and integrally united with the hub having a grooved cylindrical surface, packing rings disposed in the grooved cylindrical surface, and a cylindrical extension connected to the stationary element having cylindrical surfaces engaged by the packing rings.

2. A packing arrangement including the combination of a rotatable element and a stationary element, the rotatable element having a hub with an annular conically-shaped recess defining a plurality of concentric cylindrical surfaces with increasing diameters, the stationary element having a wedge-shaped annular portion disposed in the recess of the hub, packing teeth being formed on the wedge-shaped annular portion and arranged in cooperative relation with the cylindrical surfaces of the hub, a cylindrical extension having grooves in its outer surface formed on the hub, packing rings disposed in the grooves, and a cylindrical extension secured to the stationary element having a cylindrical bore engaged by the packing rings.

BRUNO HOFFMANN.